Patented Aug. 11, 1953

2,648,163

UNITED STATES PATENT OFFICE 2,648,163

PRODUCTION OF EDIBLE MUSHROOM MYCELIUM

Joseph Szuecs, Yonkers, N. Y., assignor of one-tenth to George M. Wiles, Roslyn, N. Y.

No Drawing. Original application December 6, 1947, Serial No. 790,227. Divided and this application July 14, 1949, Serial No. 104,821

8 Claims. (Cl. 47—1.1)

This invention relates to the production of edible mushroom mycelium and the resulting mycelium product, and has particular reference to methods of growing the said product in a commercially advantageous manner. This application is a division of my copending application Serial No. 790,227, filed December 6, 1947, now U. S. Patent 2,505,811.

The growing of mushrooms, that is, the fruiting body or sporophore, is a complex and expensive procedure, and the cost of mushrooms is rather high. Moreover, the fruiting body has a relatively low content of the characteristic mushroom flavor and taste, that is, of the essence of the mushroom. This indicates that a less costly source of mushroom flavor and taste would be especially desirable, from the commercial viewpoint.

I have discovered that the flavor of mushroom in the mushroom mycelium produced according to this invention is far greater than in the fruiting body or sporophore so that much less of the mycelium is required to produce the same flavor as the sporophore. As the result of this discovery, I have invented a method of rapidly growing abundant quantities of mushroom mycelium on low cost and readily available substrate material which is overgrown by the mycelium in a matter of days instead of weeks and the resulting mycelium product is new food stuff.

According to the present invention, the substrate material which is employed is of a moist, granular nature to be distinguished from my copending application Ser. No. 21,845, filed April 19, 1948, which employs a substantially liquid substrate material.

In order to facilitate a clear understanding of the invention, the following specific embodiments are set forth.

Example 1

The following mixture is placed in a pressure vessel:

6000 g. peanut meal (the residue remaining after removal of the oil from peanuts),
6000 g. peat (dried), and
24,000 cc. 1 normal sulfuric acid.

This mixture is heated at 15 lbs. steam pressure for 30 minutes. Then there are mixed therewith:

6000 g. calcium carbonate ($CaCO_3$),
2000 g. ground wheat soaked in
5000 cc. water.

This substrate is inoculated with 1000 g. of mycelium (e. g., of Psalliota campestris) grown on a medium of the above-described composition, or grown on a cereal medium as known in the art. The mycelium is mechanically mixed with the substrate, in order to evenly distribute small particles (which may be of the order of about 1 cu. mm. volume of inoculum) throughout the substrate mass, preferably under sterile conditions. It is convenient to use a rotary drum or tumbler for effecting thorough or uniform distribution of the mycelium throughout the substrate mass. The inoculated substrate is then transferred under sterile conditions to a vessel provided with aeration means, for instance a vertical cylindrical glass vessel, provided with an air inlet at the bottom. The bottom of the body of substrate is advantageously supported on glass wool or the like, or on a perforated disc, to provide for the even distribution of the air into and through the substrate mass, which is of a crumbly or granular structure and air readily passes therethrough. The air is preferably filtered, e. g., passed through cotton, and then bubbled through water to humidify it prior to introduction into the inoculated substrate.

The inoculated substrate is preferably maintained at a temperature of about 25° C. Lower temperatures may be used, but at lower temperatures the growth of the mycelium is too slow, and 10° C. may be regarded as a practical lower limit. Higher temperatures may be used, up to temperatures at which the mycelium is killed or destroyed, and 35° C. may be regarded as a practical upper limit, in this example. The air is passed through the inoculated substrate at about 2000 cc. per minute, which is equivalent to approximately 0.40 volume of air per bulk volume of substrate per minute. A higher rate of air flow may be used, but this is not required since no apparent advantage would be obtained thereby. A lower rate of air flow may be used, provided there is supplied to the growing mycelium the oxygen required in its normal growth processes, and the rate of air passage is sufficient to maintain the carbon dioxide concentration below that which would destroy the growing organism (the tolerance of the growing organism for carbon dioxide is known to the art).

A dense growth of mycelium throughout the substrate is obtained in about 10 days. A shorter time may be employed, provided there are no zones in the substrate which are not covered with the mycelium, indicating incomplete growth. A longer time may be employed if desired, especially if an extremely dense growth is desired.

Mycelium may be produced on a large scale by the above-described method, under industrial conditions, in a relatively short time (especially as compared to the six or more weeks required to produce the fruiting body or sporophore). The substrate is not readily susceptible to contamination, and is highly selective for mushrooms, thus assuring the predominance of a mushroom mycelium growth over the growth of interfering or contaminating organisms.

It is especially desirable to use a substrate which will give a particularly dense mycelium growth. For this purpose, seed oil residues, such as cottonseed meal, coconut meal, peanut meal, soybean meal, and the like are particularly useful. They may be advantageously mixed with a cereal material, such as wheat or the like, and also with a fibrous lignin-containing material, such as peat or the like. It is advantageous to treat the meal with mineral acid, that is, to subject it to acid hydrolyzation. After hydrolyzation, calcium carbonate or like calcium salt is preferably added, and the pH adjusted to within the range of 6 to 8. The water content of the material is preferably adjusted to within the range of 50% to 65% by weight. The substrate should be of a particulate nature. Particulate is here defined as comprising small, separate and distinct particles and is thus of a granular or crumbly texture. Thus it is important that the substrate should not become too moist and thus be pasty or clogged; that is, it should be of such a structure that air will pass therethrough readily, and also be reasonably dense.

*Example 2*

Following the above procedure, a mixture of 2000 g. of coconut meal and 3000 cc. of 1 normal sulfuric acid is heated under 15 lbs. steam pressure for 15 minutes. In a separate vessel, 6000 g. of fine pearled barley is boiled in water for 10 minutes, and the excess water is removed in a suction filter; the residue weighing 18,150 g. This boiled barley is mixed with 1000 g. of finely pulverized calcium carbonate and then the hydrolyzed coconut meal is mixed therewith. The resulting substrate contains 62.7% water by weight.

This is inoculated with 500 g. of the mycelium grown on a medium of the same composition, mixed as described above, transferred under sterile conditions to an aerated container, and aerated at 1000 cc. of air per minute.

*Example 3*

Following the above procedure, 500 g. cottonseed meal, 150 g. of peat (dried) and 750 cc. of 1 normal sulfuric acid are mixed and heated under 15 lbs. steam pressure for 15 minutes, and then mixed with 250 g. of powdered calcium carbonate and 100 cc. of water. The resulting substrate contains 48.5% water by weight. It is inoculated with 180 g. mycelium, grown on a medium of the same composition.

*Example 4*

Following the above procedure, 200 g. cottonseed meal is mixed with 300 cc. of 1 normal sulfuric acid and heated under 15 lbs. steam pressure for 15 minutes, and then mixed with 40 g. of powdered calcium carbonate and 330 g. of hydrolyzed oat hulls (that is, treated with alkali and washed with water; dry weight 144 g.). The water content of this substrate is 56% by weight. It is inoculated with 90 g. of mycelium grown on a medium of the same composition and then processed as described above.

Following the above procedure, the mycelium of other mushrooms may be grown, e. g., the *Psalliota Rodmani, Psalliota fabaceus, Pleurotus ostreatus, Polyporus umbellatus, Cantharellus cibarius, Clavaria stricta, Tricholoma rutilans, Morchella esculenta, Morchella bispora, Gyromitra esculenta,* and *Helvella elastica,* as the art will understand in view of the foregoing disclosures.

The above specific illustrations are for illustrative purposes only and are not to be regarded as necessary limitations of the invention, which includes variations and modifications which will be apparent to those skilled in the art, except as do not come within the scope of the appended claims.

I claim:

1. The method of growing edible mushroom mycelium, which comprises growing an inoculum of an edible mushroom in a moist nutrient medium having a friable plastic consistency including interpermeating particulate organic material containing nutrient support material, and aerating the medium by passing air through the medium between the particles of support material until the particles are overgrown with the mycelium within a time up to about 10 days, said air being introduced in finely dispersed form from below said medium at a rate sufficient to supply the oxygen required by the mycelium in its normal growth processes and also sufficient to maintain the carbon dioxide concentration below that which would destroy the growing mycelium.

2. The method of growing edible mushroom mycelium, which comprises growing an inoculum of an edible mushroom interpermeated with a moist crumbly nutrient medium having a plastic consistency including cereal particles as support material, and aerating the medium by passing air through the medium between the particles until the latter are overgrown with the mycelium within a time up to about 10 days, said air being introduced in finely dispersed form from below said medium at a rate sufficient to supply the oxygen required by the mycelium in its normal growth processes and also sufficient to maintain the carbon dioxide concentration below that which would destroy the growing mycelium.

3. The method of growing edible mushroom mycelium, which comprises growing an inoculum of an edible mushroom interpermeated with a moist, nutrient medium of friable plastic consistency including particulate nutrient support material, and aerating the medium by passing air upwardly through the medium between the particles until the latter are overgrown with the mycelium throughout the medium within a time up to about 10 days, said air being introduced from below said medium at a rate of about 0.4 volume of air per bulk volume of said medium per minute.

4. The method of growing edible mushroom mycelium, which comprises growing an inoculum of an edible mushroom in the presence of moisture intermixed with a granular substrate including ground cereal particles as support material for the growing mycelium, and aerating the medium by passing air upwardly between the particles of support material until the particles throughout the medium are overgrown with the mycelium within a time up to about 10 days, said air being introduced from below said medium at a rate of about 0.4 volume of air per bulk volume of said medium per minute.

5. The method of growing edible mushroom mycelium, which comprises growing an inoculum of an edible mushroom in a moisture nutrient medium intermixed therewith and having a friable plastic consistency including finely-divided edible seed, the particles of seed serving as support material for the growth of the individual mycelium, and aerating the medium by passing air upwardly between the particles of support material until the particles throughout the medium are overgrown with the mycelium within a time up to about 10 days, said air being introduced from below said medium at a rate of about 0.4 volume of air per bulk volume of said medium per minute.

6. The method of growing edible mushroom mycelium, which comprises growing an inoculum of an edible mushroom in a moist, crumbly nutrient medium including a mixture of a substantial proportion of seed oil residue and cereal particles as support material, and aerating the medium by passing air upwardly between the particles of support material until the particles throughout the medium are overgrown with the mycelium within a time up to about 10 days, said air being introduced from below said medium at a rate of about 0.4 volume of air per bulk volume of said medium per minute.

7. The method of growing edible mushroom mycelium, which comprises dispersing an inoculum of an edible mushroom through a nutrient medium including a moist, granular mixture of a substantial proportion of seed oil residue and cereal particles, said particles serving as support material for the growing mycelium, and aerating the medium by passing air upwardly therethrough until the individual particles are overgrown with the mycelium within a time up to about 10 days, said air being introduced from below said medium at a rate of about 0.4 volume of air per bulk volume of said medium per minute.

8. The method of growing edible mushroom mycelium, which comprises growing an inoculum of an edible mushroom in a moist, granular nutrient medium including a substantial proportion of seed oil residue and material particles containing lignin as support material, and aerating the medium by passing air upwardly between the particles of support material until the particles throughout the medium are overgrown with the mycelium within a time up to about 10 days, said air being introduced from below said medium at a rate of about 0.4 volume of air per bulk volume of said medium per minute.

JOSEPH SZUECS.

References Cited in the file of this patent

UNITED STATES PATENTS

| Number | Name | Date |
| --- | --- | --- |
| 1,869,517 | Sinden | Aug. 2, 1932 |
| 2,048,966 | Perry | July 28, 1936 |
| 2,440,545 | Jeffreys | Apr. 27, 1948 |
| 2,440,546 | Jeffreys | Apr. 27, 1948 |
| 2,520,318 | Lescarboura | Aug. 29, 1950 |

FOREIGN PATENTS

| Number | Country | Date |
| --- | --- | --- |
| 208,861 | Germany | Apr. 8, 1909 |
| 315,215 | Great Britain | July 10, 1930 |